United States Patent [19]  [11] Patent Number: 4,888,644
Wilson  [45] Date of Patent: Dec. 19, 1989

[54] TELEVISION CAMERA SYSTEM HAVING DIFFERENTIATED ILLUMINATION BETWEEN FIELDS

[75] Inventor: Thomas B. Wilson, Edinburgh, Scotland

[73] Assignee: Ferranti International Signal plc, Cheshire, England

[21] Appl. No.: 271,687

[22] Filed: Nov. 16, 1988

[30] Foreign Application Priority Data

Nov. 17, 1987 [GB] United Kingdom ............... 8726874

[51] Int. Cl.$^4$ ............................................ H04N 5/30
[52] U.S. Cl. .................................... 358/209; 358/225
[58] Field of Search ............... 358/101, 106, 107, 185, 358/209, 228, 225

[56] References Cited

U.S. PATENT DOCUMENTS 4,642,452 2/1987 Loy ...................................... 250/213
4,794,453 12/1988 Gneuchtel et al. ................. 358/148

FOREIGN PATENT DOCUMENTS 1242162 8/1971 United Kingdom .
1357147 6/1974 United Kingdom .

Primary Examiner—Jin F. Ng
Assistant Examiner—Stephen Brinich
Attorney, Agent, or Firm—Kerkam, Stowell, Kondracki & Clarke

[57] ABSTRACT

A system includes a television camera (10), a first source of illumination (17) operable to provide pulsed illumination of a scene to be viewed by the camera, and a second source of illumination (18) operable to provide constant illumination of the scene. Illumination control means (16) is operable to activate the first source (17) to provide a pulse of illumination prior to the commencement of each alternate field period of the television raster scan cycle. Camera control means (13) controls a gate (12) in the camera system so that, during each of these alternate field periods the camera (10) provides a first video signal representing the scene illuminated by the first source (17) at a predetermined time after the pulse of illumination. The camera control means (13) also operates the gate (12) so that, during each other frame period, the camera provides a second video signal representing the scene illuminated by the second source throughout the entire field period. A video output terminal (14) is provided, to which the first and second video signals are applied. Means may be provided for measuring the distance to an object in the scene to be viewed.

11 Claims, 3 Drawing Sheets

TELEVISION CAMERA SYSTEM HAVING DIFFERENTIATED ILLUMINATION BETWEEN FIELDS

Conventional television cameras function well with adequate lighting and good visibility of the scene to be viewed. It is common practice to use floodlights to enable such cameras to operate in conditions of low ambient light level. If, however, visibility becomes reduced, such as by the presence of smoke or mist, or other situations where optical scattering occurs, the presence of floodlighting may actually be a disadvantage. This is because light reflected back from the particles causes the lack of visibility due to the backscattered light producing a high level of glare in the camera.

The problem of backscatter may be avoided by using a pulsed illumination system together with a gated television camera. The camera is synchronised to the pulse of light so that the camera responds only to light reflected from an object at a predetermined distance. Light from objects closer to, or further from, the camera reaches the camera at a different time, and is rejected. Whilst such a system may give a clear image of an object at a certain distance from the camera, the remainder of the scene is missing. Although this system may be useful for determining the range of an object, it will not show a scene of any depth. Such a system has therefore, operational limitations for certain applications.

It is an object of the present invention to provide a television system in which the effects of backscatter may be substantially reduced.

According to the present invention there is provided a television system which includes a raster scan television camera, a first source of illumination operable to provide pulsed illumination of a scene to be viewed by the camera, a second source of illumination operable to provide continuous illumination of the scene, illumination control means operable to activate the first source to provide a pulse of illumination prior to the commencement of each alternate field period of the television raster scan cycle, camera control means operable to enable the television camera to provide, during each of said alternate field periods, a first video signal representing the scene illuminated by the first source at a predetermined time after the pulse of illumination and, during each other field period, to provide a second video signal representing the scene illuminated by the second source throughout the entire field period, and a video output terminal to which the first and second video signals are applied.

The invention will now be described with reference to the accompanying drawings, in which.

Figure 1:
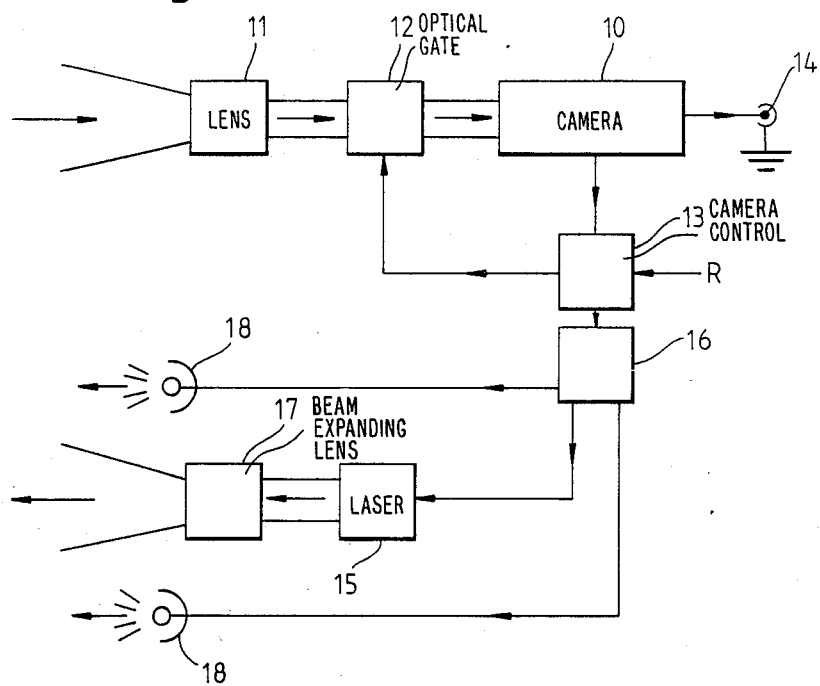
FIG. 1 is a schematic block diagram of a system according to a first embodiment of the invention.

Referring now to FIG. 1, a television system includes a television camera 10 having a lens 11 which receives light from a scene to be viewed. A gate 12 is positioned between the lens and the camera and is operable under the control of a camera control unit 13 to pass or block the light from the lens system as required. The camera 10 produces a video output signal which is applied to a video output terminal 14. An external input R to the camera control unit 13 enables the timing of the operation of gate 12 to be varied at will.

The scene to be viewed is illuminated by two sources. One of this is a pulsed source, such as a laser 15 which is fired by trigger pulses from an illumination control unit 16. Since a laser generally produces a narrow beam of light it may be necessary to use a beam-expanding lens system 17. The other source of illumination is constant and may comprise floodlights shown schematically at 18, or the illumination may be natural ambient light.

Gate 12 may conveniently be an electronically-gatable proximity-focussed microchannel plate detector. In such a device electrons emitted by a photo-cathode on to which the optical image is focussed are normally accelerated towards one side of a microchannel plate. The opposite side of the microchannel plate emits secondary electrons which are detected by an anode. This anode may be a phosphor screen. The detector may be gated off by changing the potential of the photocathode relative to the adjacent surface of the microchannel plate. Gating is very rapid, taking less than 5 nanoseconds in some instances.

Figure 2A:
FIGS. 2a-2c illustrate waveforms of signals controlling or resulting from the operation of the system of FIG. 1.
Figure 2B:
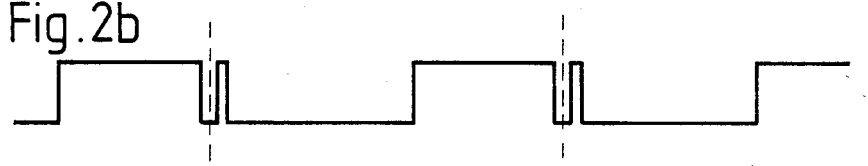
Figure 2C:
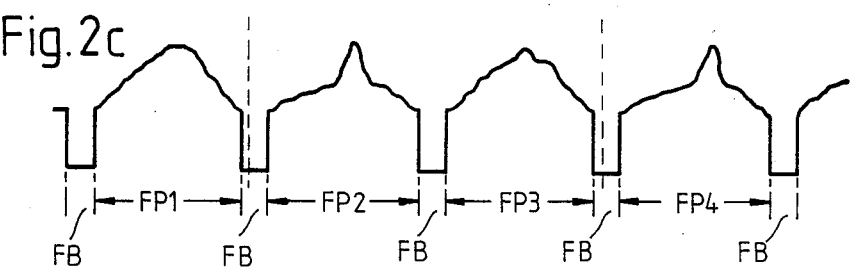

The operation of the system of FIG. 1 will now be described with reference also to the waveforms of FIG. 2. In FIG. 2, waveform (a) represents the triggering of the pulsed illumination source, waveform (b) shows the operation of the gate and waveform (c) represents the camera video output.

As wil be seen from FIG. 2, the pulsed light source is arranged to fire during alternate television field blanking periods FB, say before each even-numbered field period FP2, FP4 and so on. The gate is arranged to be open during odd-numbered field periods FP1, FP3 and so on, and is opened only for a very short time during each of the even-numbered field periods. The point in each even-numbered field period when the gate is open is variable and determines the range from the camera of any object "seen" by the camera during such period.

As already stated the first source of illumination provides constant illumination of the scene. Hence during the odd-numbered field periods such as FP1 a video waveform will be produced such as that indicated in FIG. (2c). During the following even field period, since the gate is open only for a short time the video waveform should represent only light reflected from those parts of the scene at a certain distance from the camera. However, due to storage effects in the television camera a certain small amount of the video waveform from the previous field will still be present, then the video waveform produced during the field period FP2 will represent the combined effects. In the next field period there is no pulsed illumination and the gate is again open during the entire period. The above procedure is followed during each successive field period, so that the video output signal presented to the video output terminal is of the form shown in FIG. (2c).

When the video signal output is applied to a display the time constant of the display screen phosphor has an integrating effect, giving a picture in which the content of the gated and ungated field periods are superimposed.

Figure 3:
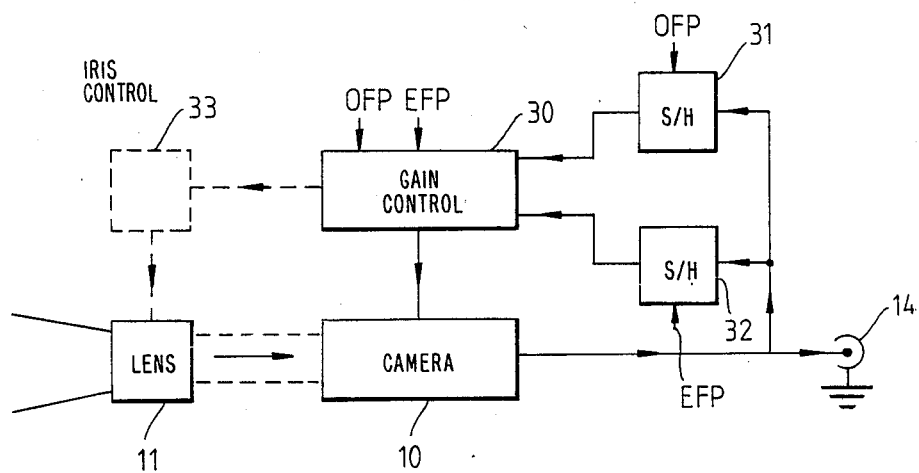
FIG. 3 shows one form of automatic gain control arrangement for the system of FIG. 1.

Clearly the amounts of light received by the television camera during the gated and ungated field periods will differ considerably. It is necessary to arrange that the camera automatic gain control circuit is able to change the gain levels between alternate field periods, so as to provide a normalised video signal level throughout. FIG. 3 illustrates one way in which this might be done. The camera automatic gain control circuit 30 is shown separate from the camera 10 and receives control inputs from two sample-and-hold circuits 31 and 32. Each of these circuits has a timing input from the camera control unit 13 of FIG. 1, circuit 31 receiving an input OFP during odd field periods whilst circuit 32 receives an input EFP during even field periods.

The camera video output signal is sampled by each sample-and-hold circuit during the appropriate field period and the held value is used during the next alternate field period to vary the camera gain.

The automatic gain control circuit 30 may also be used to control an iris incorporated in the camera lens by way of an iris control circuit 33.

Figure 4:
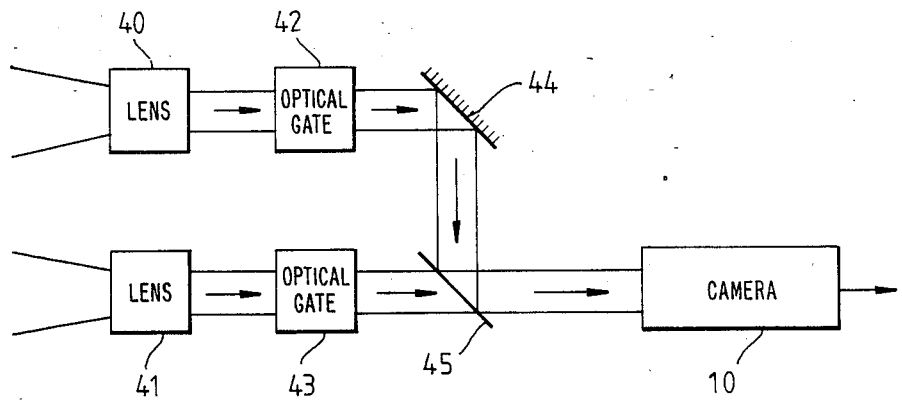
FIG. 4 is a block diagram of part of a second embodiment of the invention.

FIG. 4 illustrates an alternative optical arrangement in which two lenses 40 and 41, eahc with its own gate 42 and 43 respectively are provided. Suitable combining optics, such as a totally reflecting mirror 44 and semi-reflecting mirror 45, are used to direct light passing through the two optical systems to the single camera 10. Each gate has a control input from the camera control unit.

Figure 5:
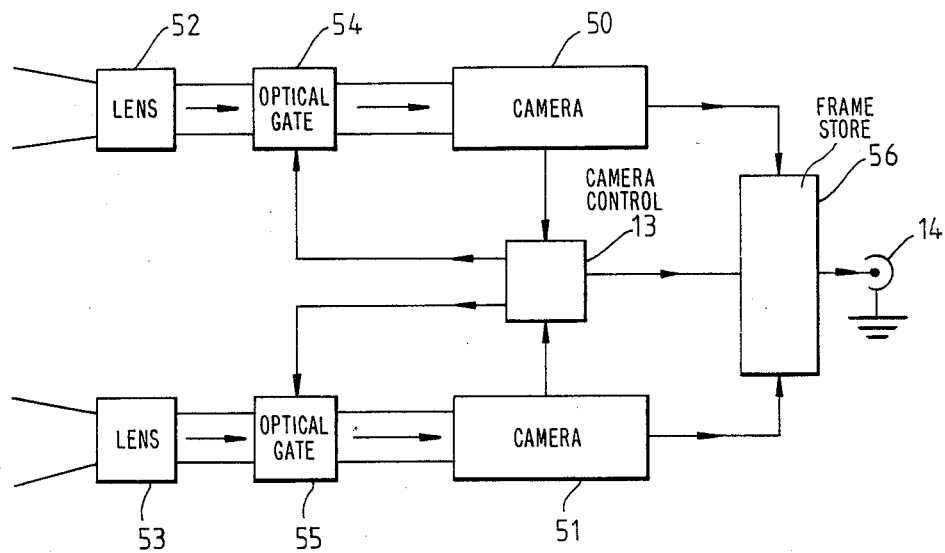
FIG. 5 is a block diagram of part of a further embodiment of the invention.

Yet another possible arrangement involves the use of two separate cameras; each with its own lens and gate. FIG. 5 illustrates such an arrangement and shows cameras 50 and 51 with lenses 52 and 53 and gates 54 and 55. The video outputs of the cameras are combined, for example by a frame store 56, to provide a common video signal at video output terminal 14. The camera control unit 13 controls the operation of the frame store 56.

The above description has been concerned with the use of an image intensifier tube as a gate. Other forms of gate may be used if suitable. Whilst it is unlikely that electro-mechanical systems will operate with sufficient speed and accuracy, electro-optical gates may exist or be developed which will satisfy the requirements of fast and accurate operation.

Figure 6:
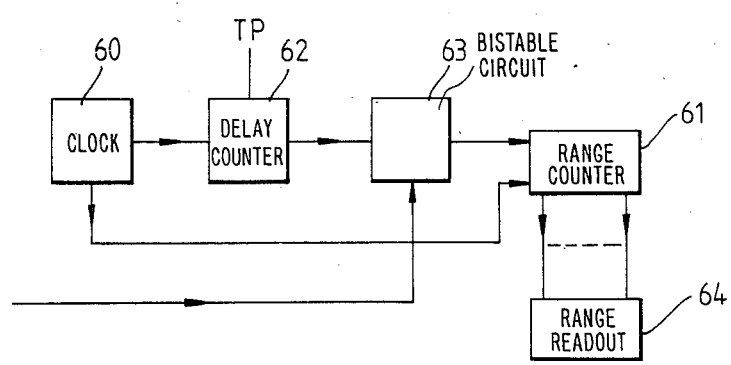
FIG. 6 is a block diagram of a range measuring circuit.

Brief mention has already been made to the measurement of range. This is possible because the camera control unit 13 of FIG. 1 already produces an accurately-timed gate control pulse to control gate 12. In order to provide an absolute measurement of range it is necessary to calibrate the gate delay interval with reference to the instant of firing of the pulsed illumination source. FIG. 6 is a block diagram of a suitable circuit. This has a clock pulse generator 60 which generates a train of clock pulses. These are applied to the clock pulse input of a range counter 61 and, through a preset delay counter, 62 into a bistable circuit 63. A second input to the bistable circuit is applied from the output of camera control unit 13 of FIG. 1 and the output of the bistable circuit is applied to the enabling input of trange counter 61. The counter output is applied to a range read-out 64.

In operation the illumination source trigger pulse TP starts the preset delay counter 62, which counts a number of pulses equal to the delay period before the emission of a light pulse from the source. After this delay the next clock pulse sets the bistable circuit 63 and allows the range counter to count clock pulses. When a pulse is received to operate gate 12 of FIG. 1, from camera control unit 13, the bistable circuit 63 again changes state and the range counter stops counting. The number of pulses counted represents the time elapsed between the illumination pulse and the operation of gate 12. If gate 12 is operated at such a time that an object whose range is required is just illuminated, then that time period represents the range of the object from the source of illumination. The speed of passage of light through the medium between source and object must, of course, be taken into account.

The illumination means may operate at any wavelength to which the camera will respond. Whilst many applications will require the use of visible light, the system will operate at other wavelengths, such as in the infra-red region of the spectrum.

I claim:

1. A television system which includes a raster scan television camera, a first source of illumination operable to provide pulsed illumination of a scene to be viewed by the camera, a second source of illumination operable to provide constant illumination of the scene, illumination control means operable to activate the first source to provide a pulse of illumination prior to the commencement of each alternate field period of the television raster scan cycle, camera control means operable to enable the television camera to provide, during each of said alternate field periods, a first video signal representing the scene illuminated by the first source at a predetermined time after the pulse of illumination and, during each other alternate field period, to provide a second video signal representing the scene illuminated by the second source throughout the entire field period, and a video output terminal to which the first and second signals are applied.

2. A system as claimed in claim 1 in which the television camera includes electro-optical gating means operable by the camera control means to control the access of light resulting from the illumination of the scene to the television camera.

3. A system as claimed in claim 2 in which the camera includes first and second lens systems each with separate electro-optical gating means, and optical means operable to direct light passing through the two gating means to be directed towards the camera.

4. A system as claimed in claim 2 which includes a second camera having second electro-optic gating means, each camera providing one only of the first and second video signals, and a frame store operable to store the said video signals and to apply them to the video output terminal.

5. A system as claimed in claim 2 in which the electro-optical gating means comprise an image intensifier.

6. A system as claimed in claim 1 in which the television camera includes automatic gain control means operable to vary the gain of the camera to correct for changes in the level of illumination in alternate field periods.

7. A system as claimed in claim 6 in which the automatic gain control includes two sample-and-hold circuits each responsive to the video signal provided by the camera during alternate ones of the field periods.

8. A system as claimed in claim 1 in which the first source of illumination includes at least one laser operable by the illumination control means to emit a pulse of light towards the scene to be viewed.

9. A system as claimed in claim 1 in which the illumination provided by the first and second sources has a wavelength falling within the visible region of the electromagnetic spectrum.

10. A system as claimed in claim 1 in which includes means for measuring the distance between the first source of illumination and an object in the scene to be viewed.

11. A system as claimed in claim 10 which includes a clock pulse generator and means for counting the number of pulses produced between the emission of a pulse of illumination by the first source and the illumination of the object as viewed by the television camera.

* * * * *